(12) United States Patent
Yang et al.

(10) Patent No.: US 10,324,786 B2
(45) Date of Patent: *Jun. 18, 2019

(54) METHOD FOR MANAGING DATA STORED IN FLASH MEMORY AND ASSOCIATED MEMORY DEVICE AND CONTROLLER

(71) Applicant: Silicon Motion Inc., Hsinchu County (TW)

(72) Inventors: Tsung-Chieh Yang, Hsinchu (TW); Li-Sheng Kan, Hsinchu County (TW)

(73) Assignee: Silicon Motion Inc., Hsinchu County (TW)

( * ) Notice: Subject to any disclaimer, the term of this patent is extended or adjusted under 35 U.S.C. 154(b) by 15 days.

This patent is subject to a terminal disclaimer.

(21) Appl. No.: 15/717,970

(22) Filed: Sep. 28, 2017

(65) Prior Publication Data

US 2018/0018224 A1   Jan. 18, 2018

Related U.S. Application Data

(63) Continuation of application No. 13/950,301, filed on Jul. 25, 2013, now Pat. No. 9,811,414.

(Continued)

(30) Foreign Application Priority Data

May 10, 2013  (TW) .............................. 102116649 A

(51) Int. Cl.
*G06F 11/10* (2006.01)
*G06F 3/00* (2006.01)

(Continued)

(52) U.S. Cl.
CPC ............ *G06F 11/1068* (2013.01); *G06F 3/00* (2013.01); *G06F 11/14* (2013.01); *G06F 12/0246* (2013.01); *G06F 2212/1032* (2013.01)

(58) Field of Classification Search
CPC .. G06F 11/14; G06F 11/1068; G06F 12/0246; G06F 2212/1032; G06F 3/00
See application file for complete search history.

(56) References Cited

U.S. PATENT DOCUMENTS

| 8,533,562 B2 | 9/2013 | Mee |
| 9,213,627 B2 | 12/2015 | Van Acht |

(Continued)

FOREIGN PATENT DOCUMENTS

| CN | 100407337 C | 7/2008 |
| CN | 101740123 A | 6/2010 |

(Continued)

*Primary Examiner* — Kyle Vallecillo
(74) *Attorney, Agent, or Firm* — Winston Hsu

(57) ABSTRACT

A method for managing data stored in a flash memory is provided, where the flash memory includes a plurality of blocks. The method includes: providing a program list, where the program list records information about programmed blocks of the plurality of blocks and sequence of write times of the programmed blocks; detecting quality of a first block of the plurality of blocks to generate a detecting result, where the first block is the programmed block that has an earliest write time; and determining whether to move contents of the first block to a blank block, and to delete the contents of the first block according to the detecting result.

19 Claims, 4 Drawing Sheets

Related U.S. Application Data

(60) Provisional application No. 61/675,355, filed on Jul. 25, 2012.

(51) Int. Cl.
  *G06F 11/14* (2006.01)
  *G06F 12/02* (2006.01)

(56) References Cited

U.S. PATENT DOCUMENTS

| | | |
|---|---|---|
| 2004/0196707 A1 | 10/2004 | Yoon |
| 2008/0028132 A1 | 1/2008 | Matsuura |
| 2008/0147998 A1 | 6/2008 | Jeong |
| 2008/0270680 A1 | 10/2008 | Chang |
| 2009/0070529 A1 | 3/2009 | Mee |
| 2009/0265403 A1 | 10/2009 | Fukumoto |
| 2009/0307412 A1* | 12/2009 | Yeh ............... G06F 12/0246 711/103 |
| 2010/0037009 A1* | 2/2010 | Yano ............... G06F 12/0246 711/103 |
| 2010/0115194 A1 | 5/2010 | Suzuki |
| 2010/0131697 A1 | 5/2010 | Alrod |
| 2010/0299494 A1 | 11/2010 | Van Acht |
| 2010/0313084 A1 | 12/2010 | Hida |
| 2011/0066808 A1* | 3/2011 | Flynn ............... G06F 12/0246 711/118 |
| 2011/0078363 A1* | 3/2011 | Yeh ............... G06F 12/0246 711/103 |
| 2011/0209028 A1 | 8/2011 | Post |
| 2012/0137104 A1 | 5/2012 | Fan |
| 2012/0246393 A1* | 9/2012 | Hashimoto ......... G06F 12/0246 711/103 |
| 2013/0031443 A1 | 1/2013 | Oh |

FOREIGN PATENT DOCUMENTS

| | | |
|---|---|---|
| CN | 102043725 A | 5/2011 |
| EP | 1 469 481 B1 | 8/2009 |
| KR | 1020130013574 A | 2/2013 |
| TW | 201110126 | 3/2011 |
| TW | 201115580 | 5/2011 |
| TW | I351604 | 11/2011 |
| TW | I355668 | 1/2012 |
| TW | I386800 | 2/2013 |

* cited by examiner

200

| B14 | B2 | B3 | B4 | B7 | B8 | B9 | B10 | B11 |

FIG. 2

METHOD FOR MANAGING DATA STORED IN FLASH MEMORY AND ASSOCIATED MEMORY DEVICE AND CONTROLLER

CROSS REFERENCE TO RELATED APPLICATIONS

This is a continuation of the co-pending U.S. application Ser. No. 13/950,301 (filed on Jul. 25, 2013), which claims the benefit of U.S. provisional application 61/675,355 (filed on Jul. 25, 2012). The entire content of the related applications is incorporated herein by reference.

BACKGROUND OF THE INVENTION

1. Field of the Invention

The disclosed embodiments of the present invention relate to a flash memory, and more particularly, to a method for managing data stored in a flash memory and related memory apparatus and controller.

2. Description of the Prior Art

A flash memory can be used to store data through electrical erase and write/program, and is widely applied in the field of memory cards, solid-state drives, portable multimedia players, etc. Because the flash memory is a non-volatile memory, there is no need for extra power to maintain what is stored in the flash memory. In addition, the flash memory provides high speed data access and excellent vibration resistance, which explains its popularity.

The flash memories can be classified into two categories: NOR flash memories and NAND flash memories. For the later, the erase time and program time is shorter, and the die size of each memory cell is smaller. Thus, compared with the NOR flash memory, the NAND flash memory permits higher storage density and lower cost per bit. Generally speaking, the flash memory consists of memory cell arrays, wherein each memory cell is implemented using a floating-gate transistor in practice, and the threshold voltage of the memory cell is configured by properly controlling charge number at a floating gate of the floating-gate transistor to thereby store a single-bit data or a multi-bit data. Therefore, when one or more predetermined control gate voltages are imposed at the control gate of the floating-gate transistor, a conduction status of the floating-gate transistor will indicate one or more binary digits stored in the floating-gate transistor.

However, due to certain reasons, the original charge number of the flash memory may be affected/disturbed. For instance, the disturbance may come from retention disturbance, and a number of charges stored in the flash memory may changes due to high temperature. Hence, threshold voltage distribution of memory cells of the flash memory may change by the effect of retention time and/or temperature, and the data read from the memory cells may be erroneous since the threshold voltage distribution may be different from the original threshold voltage.

SUMMARY OF THE INVENTION

Therefore, one of the objectives of the present invention is to provide a method for managing data stored in a flash memory and related memory apparatus and controller, to avoid severe distortion of the data stored in memory cells.

According to an embodiment of the present invention, a method for managing data stored in a flash memory is disclosed. Where, the flash memory comprises a plurality of blocks, the method comprises: providing a program list, where the program list records information about programmed blocks of the plurality of blocks and sequence of write times of the programmed blocks; detecting quality of a first block of the plurality of blocks to generate a first detection result, where the first block is the programmed block that has an earliest write time; and determining whether to move contents of the first block to a blank block, and delete the contents of the first block according to the first detection result.

According to another embodiment of the present invention, a memory apparatus is disclosed. The memory apparatus comprises a flash memory and a controller. The flash memory comprises a plurality of blocks. The controller comprises a memory for storing a program list, where the program list records information about programmed blocks of the plurality of blocks and sequence of write times of the programmed blocks. Where the controller detects quality of a first block of the plurality of blocks to generate a first detection result, where the first block is the programmed block that has an earliest write time; and determines whether to move contents of the first block to a blank block, and delete the contents of the first block according to the first detection result.

According to yet another embodiment of the present invention, a controller of a flash memory is disclosed. Where the controller is arranged for accessing a flash memory, the flash memory comprises a plurality of blocks, and the controller comprises a memory and a micro processor. The memory is arranged for storing a program code and a program list, where the program list records information about programmed blocks of the plurality of blocks and sequence of write times of the programmed blocks. The micro processor is arranged for executing the program code to control access of the flash memory and manage the plurality of blocks. Where the micro processor detects quality of a first block of the plurality of blocks to generate a first detection result, where the first block is the programmed block that has an earliest write time; and determines whether to move contents of the first block to a blank block, and delete the contents of the first block according to the first detection result.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 2 is a diagram illustrating a program list according to an embodiment of the present invention.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is electrically connected to another device, that connection may be through a direct electrical connection, or through an indirect electrical connection via other devices and connections.

Figure 1:
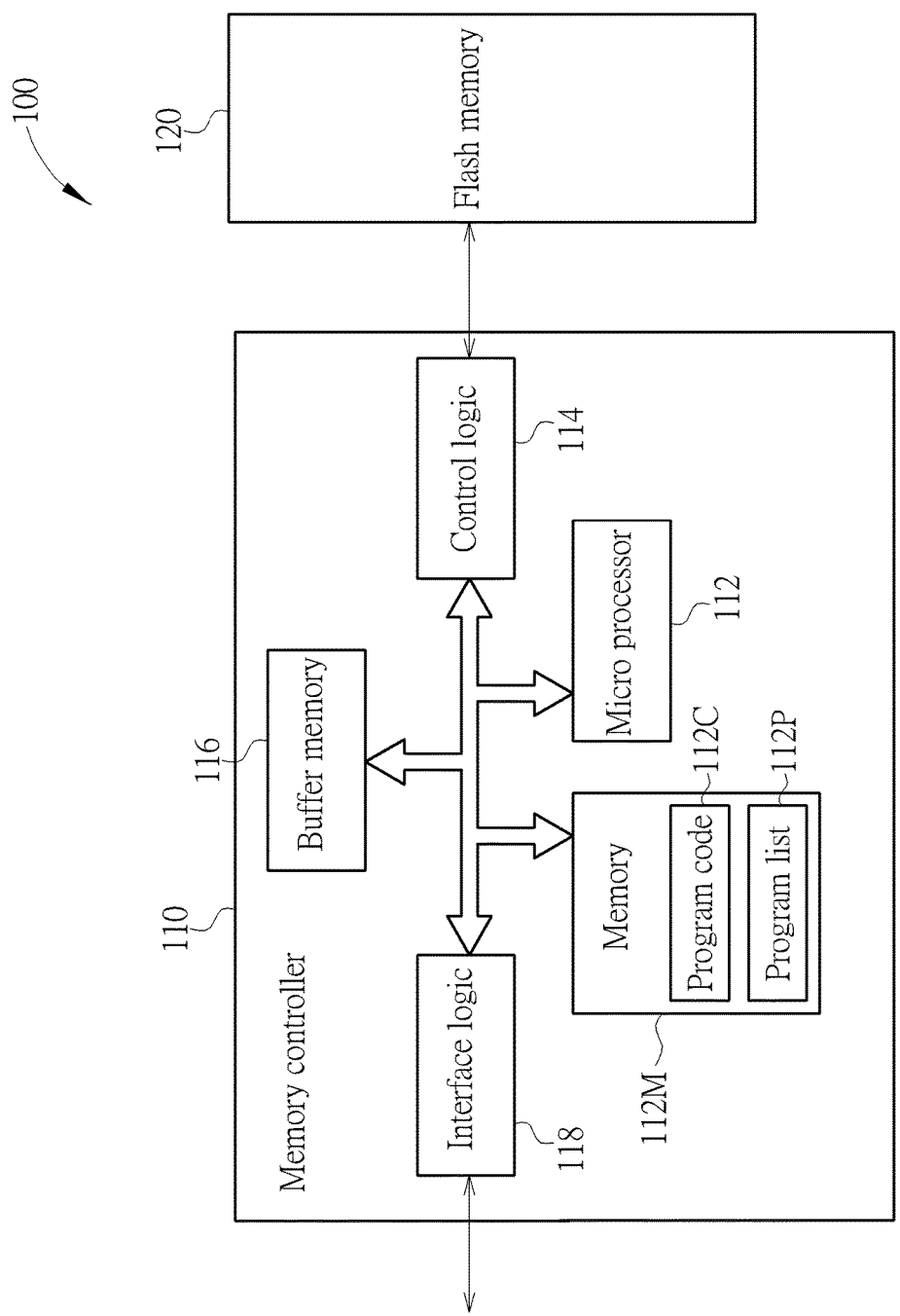
FIG. 1 is a diagram illustrating a memory apparatus according to an embodiment of the present invention.

Please refer to FIG. 1, which is a diagram illustrating a memory apparatus 100 according to an embodiment of the present invention. The memory apparatus 100 of the present invention is particularly a portable memory apparatus (e.g. a memory card complying with SD/MMC, CF, MS or XD standard). The memory apparatus 100 includes a flash memory 120 and a controller. The controller may be a memory controller 110 arranged for accessing the flash memory 120. According to this embodiment, the memory controller 110 includes a micro processor 112, a memory 112M, a control logic 114, a buffer memory 116 and an interface logic 118. The memory 112M is used for storing a program code 112C, and the micro processor 112 is used for executing the program code 112C to control access of the flash memory 120.

In a typical case, the flash memory 120 includes a plurality of blocks, and the controller (e.g. the memory controller 110 which executes the program code 112C through the micro processor 112) performs processes, including copying data, erasing data, merging data, etc., upon the flash memory 120, where the erase process is a block based process. In addition, a block records a specific number of pages, wherein the write process performed by the controller (e.g. the memory controller 110 which executes the program code 112C through the micro processor 112) upon the flash memory 120 is a page based process.

In practice, the memory controller 110 may utilize its internal components to perform a variety of processes. For instance, the memory controller 110 utilizes the control logic 114 to control the access of the flash memory 120 (particularly, the access of at least one block or at least one page), or utilizes the buffer memory 116 to perform the desired buffering process, or utilizes the interface logic 118 to communicate with a host device.

Figure 2:
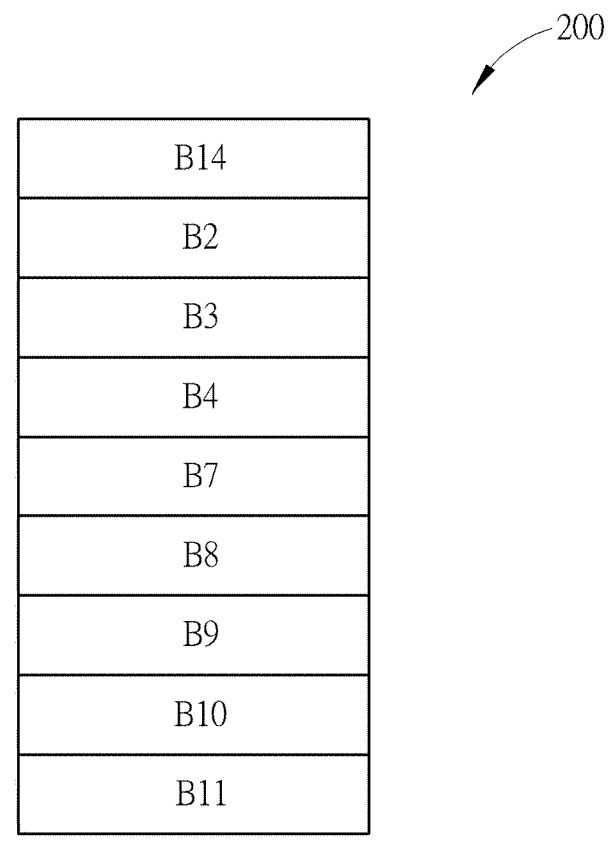

In addition, the memory 112M has a program list 112P stored therein, where the program list 112P records information about programmed blocks of the plurality of blocks and sequence of write times (relative write times) of the programmed blocks. For instance, please refer to FIG. 2, which is a diagram illustrating a program list 200 according to an embodiment of the present invention. As depicted in FIG. 2, it is assumed that the flash memory 120 has total N blocks B1-BN, where block B2-B4, B7-B11 and B14 are programmed previously, and sequence of write times thereof is B14, B2-B4, B7-B11. Hence, the program list 200 may sequentially record blocks B14, B2-B4, B7-B11 on behalf of the sequence of write times of the programmed blocks. However, it should be noted that contents of the program list 200 depicted in FIG. 2 are for illustrative purposes only, and not limitations of the present invention. In other embodiments of the present invention, it may be replaced by a different recording manner to record information about programmed blocks of a plurality of blocks and sequence of write times (relative write times) of the programmed blocks.

Figure 3:
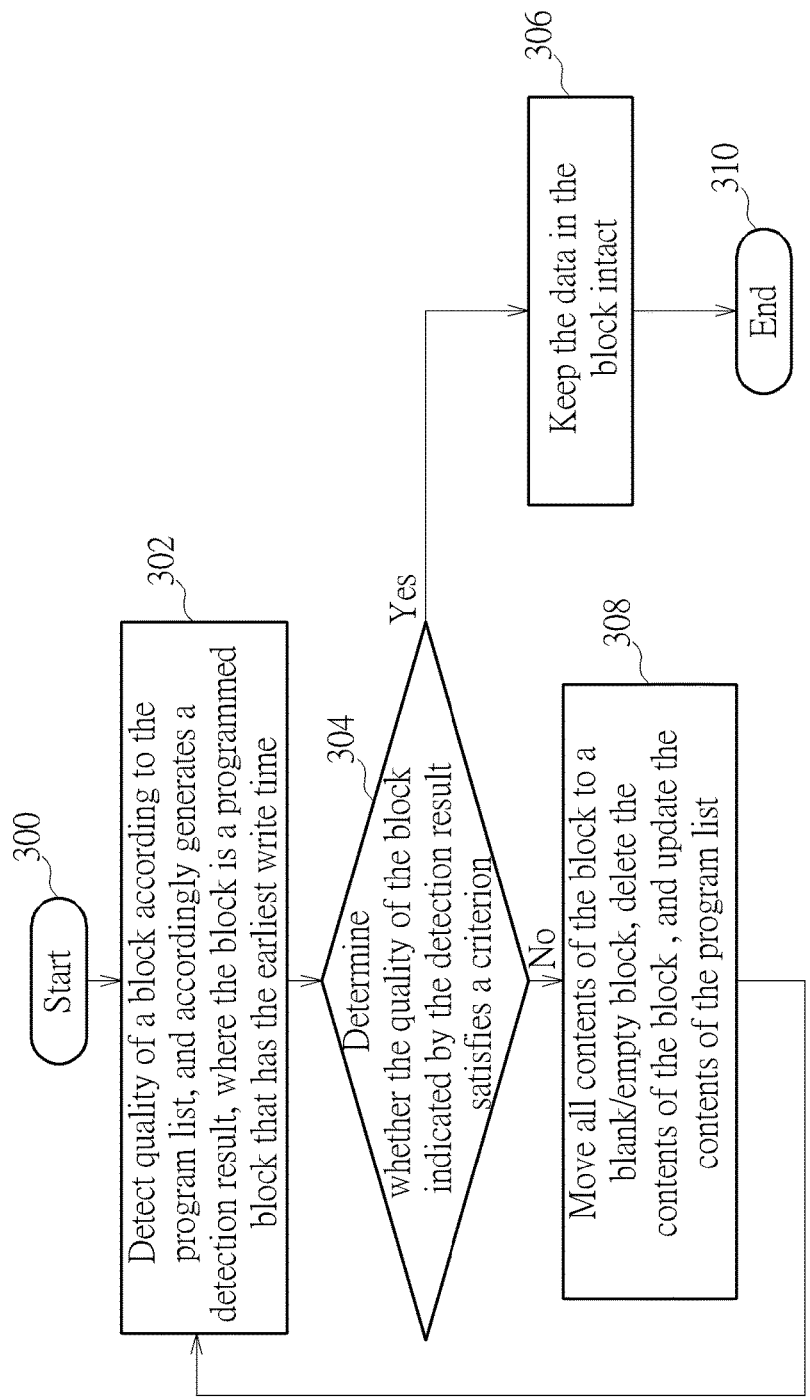
FIG. 3 is flowchart illustrating a method for managing data stored in the flash memory according to an embodiment of the present invention.

Please refer to FIGS. 1-3 together. FIG. 3 is a flowchart illustrating a method for managing data stored in the flash memory 120 according to an embodiment of the present invention. The method is described as follows.

In step 300, the flow starts. In step 302, when the memory controller 110 is in an idle status (i.e. the memory controller 110 is not receiving and executing any commands), the micro processor 112 detects quality of a block according to the program list 112P, and accordingly generates a detection result, where the block is a programmed block that has the earliest write time. Taking the program list 200 shown in FIG. 2 for example, the micro processor 112 performs the quality detection in respect of the block B14. Specifically speaking, the micro processor 112 generates the detection result by reading at least a portion of contents of the block B14 (e.g. at least a portion of pages) and a bit error rate or bit error amount obtained during the decoding process. Alternatively, the micro processor 112 may generate the detection result by detecting a threshold voltage shifting status of at least a portion of memory cells included in the block B14, where each memory cell may be implemented by a floating-gate transistor.

Next, in step 304, the micro processor 112 determines whether the quality of the block indicated by the detection result satisfies a criterion. If the quality of the block indicated by the detection result does satisfy the criterion, the flow will enter step 306; otherwise, step 308 will be performed. In details, considering a case where the micro processor 112 generates the detection result by detecting the bit error rate orbit error amount of at least a portion of contents of the block B14 (step 302), when the detection result indicates that the bit error rate or the bit error amount of the at least a portion of contents of the block B14 is higher than a threshold (step 304), the flow will enter step 308. When the detection result indicates the bit error rate or the bit error amount of the at least a portion of contents of the block B14 is lower than the threshold, the flow will enter step 306. Furthermore, considering another case where the micro processor 112 generates the detection result by detecting the threshold voltage shifting status of at least a portion of memory cells included in the block B14 (step 302), when the detection result indicates the threshold voltage shifting status of the at least a portion of memory cells included in the block B14 does not satisfy a criterion (step 304), the flow will enter step 308. When the detection result indicates the threshold voltage shifting status of the at least a portion of memory cells included in the block B14 does satisfy the criterion, the flow will enter step 306.

In step 306, since the quality of the block B14 meets the criterion, the micro processor 112 therefore keeps the data in the block B14 intact. That is to say, the content of the block B14 is allowed to remain unchanged for extending memory life. Besides, since the block B14 is the programmed block that has the earliest write time, other blocks B2-B4 and B7-B11 having relatively later write time are unlikely to have data distortion issues caused by excessive retention time at this moment. Therefore, it is needless for the micro processor 112 to perform detection and determination process upon other blocks, and step 310 can be entered directly to end the flow.

Figure 4:
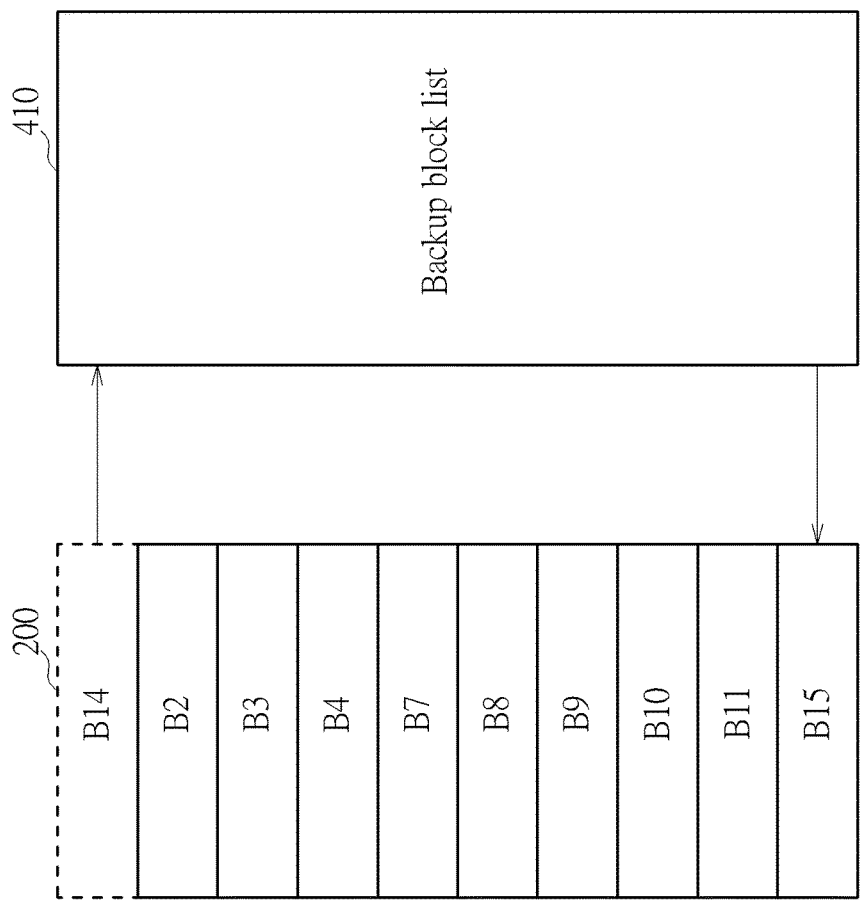
FIG. 4 is diagram illustrating the step of moving contents of a block which has an earliest write time in the updated program list to a blank block.

In step 308, since the quality of the block B14 does not meet the criterion, the micro processor 112 moves all contents of the block B14 to a blank/empty block, deletes the contents of the block B14, and updates the contents of the program list 200. For instance, referring to FIG. 4, if the entire contents of the block B14 are moved to the block B15, then the records associated with the block B14 in the program list 200 will be deleted, and the contents of the block B14 will be deleted. Moreover, a built-in backup block list 410 (which is arranged for recording which blocks in the flash memory 120 are blank) of the program code 112C will become a blank block. The program list 200 will further append a record pertain to the block B15 to its end. In addition, in the course of moving the entire contents of the block B14 to the block B15, decoding and error correction operations are performed upon the data by the memory controller 110. Therefore, the data moved to the block B15 has better quality.

After step 308 is completed, the flow goes back to step 302 to detect quality of the block B2 to generate a detection result, wherein the block B2 is the programmed block that has the earliest write time recorded in the updated program list 200. Next, the aforementioned process is repeated.

In summary, the method for managing data stored in a flash memory and related memory apparatus and controller utilize an idle period of the memory controller to move contents of a programmed block that has the earliest write time (i.e. longest retention time) and poor quality to a different block. In this way, the undesired situation of threshold voltage distribution variation and data distortion in a block with long retention time can be prevented.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for managing data stored in a flash memory, wherein the flash memory comprises a plurality of blocks; the method comprising:
   reading a program list from a memory within a memory controller for controlling the flash memory, wherein the program list records information about programmed blocks of the plurality of blocks and sequence of write times of the programmed blocks, and the memory within the memory controller is different from the flash memory;
   determining a first block of the plurality of blocks according to the program list, wherein the first block is a programmed block that has an earliest write time in the program list, and the first block is a starting block for a quality detection operation;
   starting the quality detection operation to read the first block to detect quality of the first block to generate a first detection result;
   referring to the first detection result to determine whether to move contents of the first block to a third block.

2. The method of claim 1, further comprising:
   when the contents of the first block are moved to the third block, deleting records associated with the first block in the program list, and adding records associated with the third block into the program list stored in the memory within the memory controller.

3. The method of claim 1, wherein the step of starting the quality detection operation to read the first block to detect quality of the first block to generate the first detection result comprises:
   starting the quality detection operation to detect a bit error rate or a bit error amount of at least a portion of data of the first block to generate the first detection result.

4. The method of claim 3, wherein the step of determining whether to move the contents of the first block to the third block comprises:
   when the first detection result indicates that the bit error rate or the bit error amount of the at least a portion of data of the first block is higher than a threshold, moving the contents of the first block to the third block, and deleting the contents of the first block; and
   when the first detection result indicates the bit error rate or the bit error amount of the at least a portion of data of the first block is lower than the threshold, keeping the contents of the first block intact.

5. The method of claim 1, wherein the first block comprises a plurality of memory cells, and the step of starting the quality detection operation to read the first block to detect quality of the first block to generate the first detection result comprises:
   starting the quality detection operation to detect a threshold voltage shifting status of at least a portion of the plurality of memory cells to generate the first detection result.

6. The method of claim 5, wherein the step of determining whether to move the contents of the first block to the third block comprises:
   when the first detection result indicates that the threshold voltage shifting status of the at least a portion of the plurality of memory cells does not satisfy a criterion, moving the contents of the first block to the third block, and deleting the contents of the first block; and
   when the first detection result indicates that the threshold voltage shifting status of the at least a portion of the plurality of memory cells satisfies the criterion, keeping the contents of the first block intact.

7. A memory apparatus, comprising:
   a flash memory, comprising a plurality of blocks; and
   a controller, comprising a memory for storing a program list, wherein the program list records information about programmed blocks of the plurality of blocks and sequence of write times of the programmed blocks;
   wherein the controller determines a first block of the plurality of blocks by directly using the program list stored within the memory of the controller, wherein the first block is a programmed block that has an earliest write time in the program list, and the first block is a starting block for a quality detection operation; the controller starts the quality detection operation to read the first block to detect quality of the first block to generate a first detection result; and the controller refers to the first detection result to determine whether to move contents of the first block to a third block and delete the contents of the first block.

8. The memory apparatus of claim 7, wherein when the contents of the first block are moved to the third block, the controller deletes records associated with the first block in the program list, and adds records associated with the third block into the program list stored in the memory within the controller.

9. The memory apparatus of claim 7, wherein the controller detects a bit error rate or a bit error amount of at least a portion of data of the first block to generate the first detection result.

10. The memory apparatus of claim 9, wherein when the first detection result indicates that the bit error rate or the bit error amount of the at least a portion of data of the first block is higher than a threshold, the controller moves the contents of the first block to the third block, and deletes the contents of the first block; and when the first detection result indicates that the bit error rate or the bit error amount of the at least a portion of data of the first block is lower than the threshold, the controller keeps the contents of the first block intact.

11. The memory apparatus of claim 7, wherein the first block comprises a plurality of memory cells, and the controller detects a threshold voltage shifting status of at least a portion of the plurality of memory cells to generate the first detection result.

12. The memory apparatus of claim 11, wherein when the first detection result indicates that the threshold voltage shifting status of the at least a portion of the plurality of memory cells does not satisfy a criterion, the controller moves the contents of the first block to the third block, and deletes the contents of the first block; and when the first detection result indicates that the threshold voltage shifting status of the at least a portion of the plurality of memory cells satisfies the criterion, the controller keeps the contents of the first block intact.

13. A controller for accessing a flash memory, wherein the flash memory comprises a plurality of blocks; the controller comprising:
- a memory, arranged for storing a program code and a program list, wherein the program list records information about programmed blocks of the plurality of blocks and sequence of write times of the programmed blocks; and
- a micro processor, arranged for executing the program code to control access of the flash memory and manage the plurality of blocks;
- wherein the micro processor determines a first block of the plurality of blocks by directly using the program list stored within the memory of the controller, wherein the first block is a programmed block that has an earliest write time in the program list, and the first block is a starting block for a quality detection operation; the micro processor starts the quality detection operation to read the first block to detect quality of the first block to generate a first detection result; and the micro processor refers to the first detection result to determine whether to move contents of the first block to a third block and delete the contents of the first block.

14. The controller of claim 13, wherein when the contents of the first block are moved to the third block, the micro processor deletes records associated with the first block in the program list, and adds records associated with the third block into the program list stored in the memory.

15. The controller of claim 13, wherein the micro processor detects a bit error rate or a bit error amount of at least a portion of data of the first block to generate the first detection result.

16. The controller of claim 15, wherein when the first detection result indicates that the bit error rate or the bit error amount of the at least a portion of data of the first block is higher than a threshold, the micro processor moves the contents of the first block to the third block, and deletes the contents of the first block; and when the first detection result indicates that the bit error rate or the bit error amount of the at least a portion of data of the first block is lower than the threshold, the micro processor keeps the contents of the first block intact.

17. The controller of claim 13, wherein the first block comprises a plurality of memory cells, and the micro processor detects a threshold voltage shifting status of at least a portion of the plurality of memory cells to generate the first detection result.

18. The controller of claim 17, wherein when the first detection result indicates that the threshold voltage shifting status of the at least a portion of the plurality of memory cells does not satisfy a criterion, the micro processor moves the contents of the first block to the third block, and deletes the contents of the first block; and when the first detection result indicates that the threshold voltage shifting status of the at least a portion of the plurality of memory cells satisfies the criterion, the micro processor keeps the contents of the first block intact.

19. The controller of claim 13, wherein the micro processor starts to generate the first detection result by detecting quality of the first block of the plurality of block when the controller is in an idle period.

\* \* \* \* \*